United States Patent [19]

Wahlstrom

[11] 4,126,822
[45] Nov. 21, 1978

[54] ELECTROSTATIC GENERATOR AND MOTOR

[76] Inventor: Sven E. Wahlstrom, 570 Jackson Dr., Palo Alto, Calif. 94303

[21] Appl. No.: 801,242

[22] Filed: May 27, 1977

[51] Int. Cl.² .................................. H02N 1/00
[52] U.S. Cl. ....................... 322/2 A; 310/309; 320/1
[58] Field of Search ............ 322/2 A; 310/300, 308, 310/309, 310; 320/1

[56] References Cited

U.S. PATENT DOCUMENTS

| | | | |
|---|---|---|---|
| 2,413,391 | 12/1946 | Usselman | 171/97 |
| 2,449,077 | 9/1948 | Lindenblad | 175/363 |
| 2,628,330 | 2/1953 | Williams | 315/200 |
| 2,700,901 | 2/1955 | Rickner | 73/304 |
| 3,005,305 | 10/1961 | Thoma | 58/28 |
| 3,008,334 | 11/1961 | Lees | 73/503 |
| 3,013,201 | 12/1961 | Goldie | 322/2 |
| 3,094,653 | 6/1963 | Le May et al. | 322/2 |
| 3,147,390 | 9/1964 | Beam | 310/4 |
| 3,154,699 | 10/1964 | Courtney-Pratt | 307/108 |
| 3,405,334 | 10/1968 | Jewett et al. | 317/250 |
| 3,412,318 | 11/1968 | Robinson et al. | 322/2 |
| 3,582,693 | 6/1971 | O'Hare | 310/10 |
| 3,610,970 | 10/1971 | Skinner | 310/10 |
| 3,737,688 | 6/1973 | O'Hare | 310/2 |

*Primary Examiner*—Robert J. Hickey
*Attorney, Agent, or Firm*—Flehr, Hohbach, Test, Albritton & Herbert

[57] ABSTRACT

Method and apparatus for electrostatically generating power by converting random mechanical motion into electrical energy. The apparatus includes two variable capacitors that have their capacitances varied in an alternating manner by the physical displacement of a common conductor that forms one plate in each of the capacitors. The variable capacitors are formed in a container which holds a fluid for increasing the output power of the apparatus. The fluid in combination with movable conductor also generates sufficient charge to bias the variable capacitors.

29 Claims, 6 Drawing Figures

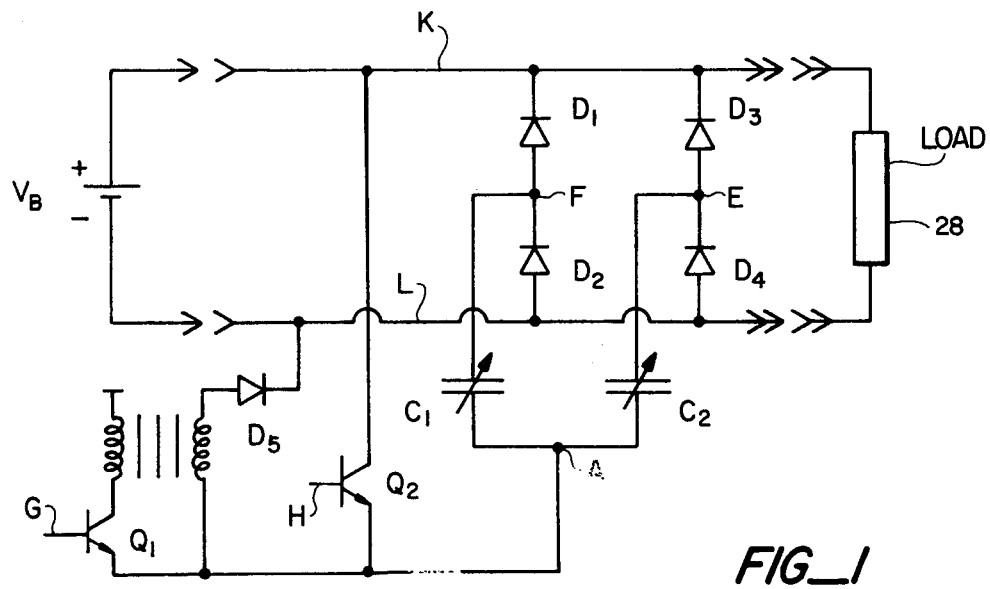
FIG_1
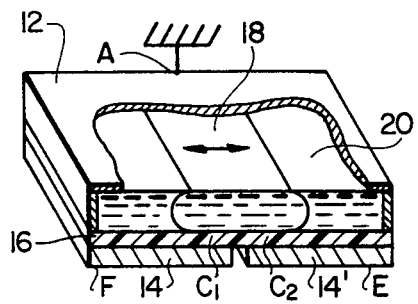
FIG_2
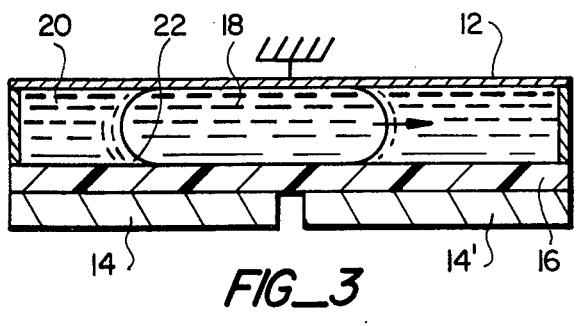
FIG_3
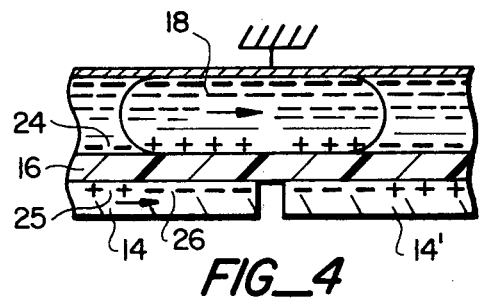
FIG_4
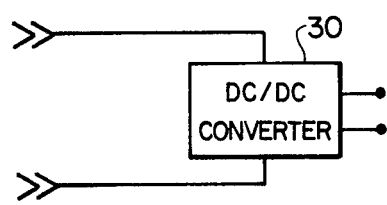
FIG_5
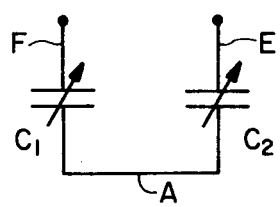
FIG_6

ELECTROSTATIC GENERATOR AND MOTOR

BACKGROUND OF THE INVENTION

1. Field of the Invention

This invention generally relates to electrical power-generating systems, and more particularly, to electrostatic generators.

2. Description of the Prior Art

In the past the need for replacing storage batteries has presented problems in convenience, planning and cost. These problems were especially important for the batteries used in portable electronic and electrical equipment. For example, the batteries used for electrical watches, portable radios, calculators, and hearing aids heretofore required frequent replacement. This replacement often was annoying to the owner because of the length of time the equipment was out of service and the high replacement cost of the batteries.

In the watch industry there has been a continuing search for a power source that can make electronic watches as maintenance free as self-winding watches. The industry has been looking for a system that will permit electronic watches to operate indefinitely.

Recently, there has developed a particular problem in the electronic watch industry. Digital watches have become fashionable and some are equipped with light emitting diodes. These diodes draw more current than conventional electronic watch circuits, and often the batteries in these watches require replacement every three or four months. At the present time none of the commercially available electronic watch circuits are equipped with a battery charging system, and the watch battery must be replaced each time the battery is discharged.

The present invention incorporates the well known physical principle that electrical energy can be generated from mechanical motion by mechanically alternating the capacitances of a plurality of capacitors. This principle, however, has never been successfully incorporated into battery charging systems and power generators because the output of these previous systems was too unsymmetrical. Although current was generated in these older systems, the systems could not be adapted to efficiently generate usable AC power.

Another problem encountered with prior electrostatic generators has been the electrical breakdown of the medium between the plates of the capacitors. These generators most efficiently generate power when operated at as high a voltage as possible. Heretofore the upper operating voltage limit was determined by the electrical breakdown of the medium between the plates. For example, if air surrounds the plates, then at high voltage, the electric field causes the air to ionize. The conductive ions thus produced deposit on the surface of the dielectric and make its surface electrically neutral. This type of electrical breakdown of the medium greatly reduces the efficiency of the system.

The present invention also makes use of the triboelectric effect as an alternative principle of operation. The triboelectric effect is the generation of electric charge as a result of the friction between two bodies. The bodies move with respect to each other and electric charge builds up. The moving bodies are fabricated from different materials and the amount of charge produced is proportional to the amount and the frequency of the frictional contact.

SUMMARY OF THE INVENTION

It is an object of the present invention to provide a novel method and apparatus that overcomes the limitations and disadvantages of the prior art.

A further object of the present invention is to convert random mechanical motion into electrical energy by utilizing both gravitational and acceleration forces.

An additional object of the present invention is to develop an electrical energy generator for use in applications where space is at a minimum. This objective includes developing a circuit that operates in the simplest possible manner, utilizes a minimum number of components, and contains the simplest possible circuit. One application of the present invention is for charging electronic watch batteries where space and weight are both limited.

Another object of the present invention is to increase the power-generating efficiency of an electrostatic generator by raising the capacitor breakdown voltage. This permits the generator to operate at a higher voltage and gives the capacitors higher field strength.

Still another object of the present invention is to utilize the triboelectric effect and to eliminate the need for a bias supply for the capacitors. The elimination of the bias supply in the present invention both simplifies the electrical circuit and reduces the cost of producing the apparatus.

These and other features are embodied in a method and apparatus for electrostatically generating power by converting random mechanical motion into electrical energy. The apparatus includes two variable capacitors formed in a container for holding a fluid. The capacitors share a common dielectric member and a common plate. Mechanical motion is used to inversely alternate the capacitance of the two capacitors. The container is filled with a fluid for reducing charge leakage and for increasing the electrical breakdown voltage of the capacitors. This fluid with properly selected properties in combination with the movable conductive plate also generates sufficient charge via the triboelectric effect to bias the two variable capacitors during operation.

A feature of the present invention is that the threshold voltage at which power generation is commenced is easily reached for any small, relative change in the values of capacitance of the variable capacitors. In addition, although the cycle of voltage oscillation and the amount of electrical charge transferred between the capacitors are both dependent on the amount of mechanical motion, these two quantities are completely independent of the rate at which the mechanical motion occurs. Although a slow rate of mechanical motion generates a lower current, power generation in the present invention never ceases as long as capacitor modulation exceeds a predetermined minimum value.

Additional objects and features of the invention will appear from the following description in which the preferred embodiment has been set forth in detail in conjunction with the accompanying drawings.

BRIEF DESCRIPTION OF THE DRAWINGS

FIG. 1 is a schematic diagram of one embodiment of the circuit of the present invention.

FIG. 2 is a perspective view, partially cut away, of a variable capacitance, electrical energy generator according to the present invention.

FIG. 3 is a side elevation, in section, of the electrical energy generator of FIG. 2.

FIG. 4 is a side elevation, in section and partially cut away, of the electrical energy generator of FIG. 2, illustrating the triboelectric generation of charges.

FIG. 5 is a block diagram of one output for the circuit of FIG. 1.

FIG. 6 is a schematic diagram of an alternative embodiment of the present invention illustrating the apparatus as an AC generator.

DESCRIPTION OF THE PREFERRED EMBODIMENTS

FIG. 1 is a schematic diagram of the basic circuit of the present invention. The apparatus includes two variable capacitors C1 and C2 that are mechanically connected together so that the capacitance of each varies in an alternating manner. When the capacitance of C1 is at a maximum, the capacitance of C2 is at a minimum, and when the capacitance of C2 is at a maximum, the capacitance of C1 is at a minimum. The capacitance of these capacitors is on the order of 10,000 picofarads.

FIG. 2 illustrates the construction of the two capacitors C1, C2. The capacitors are formed in a wall of a container 12 for holding a fluid 20. The other walls of the container are electrically conductive and the container is fluid tight. Each capacitor includes a separate stationary conductor 14, 14'. These conductors are two metal plates that are positioned at the extreme ends of the motion of a moving conductor 18. The moving conductor serves as a common capacitor plate to both capacitors. In the preferred embodiment the moving conductor is a drop of mercury. The two variable capacitors also share a common dielectric member 16. The two stationary conductors are rigidly attached to the bottom surface of the dielectric member 16. The moving conductor 18 slides back and forth within the container 12 and on top of the dielectric member 16. The capacitors C1 and C2 are formed by the dielectric member 16, the common conductor 18, and the separate stationary conductors 14, 14'. The circuit illustrated in FIG. 1 is connected to the apparatus of FIG. 2 at points A, E, and F, as indicated in FIG. 2.

The movable conductor 18 is surrounded by a fluid 20 which raises the breakdown voltage of the two capacitors. This fluid is retained in the container 12 and is selected to have very low conductivity and high breakdown voltage.

It has been observed that when atmospheric air is used between the capacitor plates of an electrostatic generator, the air ionizes at high voltages and reduces the efficiency of the generator. This ionization can be explained with the help of FIG. 3. When the drop of mercury 18 moves from left to right, the trailing edge of the mercury continuously uncovers a small wedge-shaped gap 22. In this gap, the force of the electric field is intensified because of the narrow dimensions. The field causes the thin film of air in the gap to ionize. When the air ionizes, the negative ions are attracted to the positively charged mercury drop 18 and the positive ions are attracted to the upper surface of the dielectric member 16 by the negatively charged plates 14, 14'. These ionized particles tend to maintain a potential on the dielectric surface approaching that of the mercury, thus significantly reducing the transfer of charge between the plates of the capacitors.

The wedge-shaped gap 22 at the edge of the mercury drop can also be visualized as one of two dielectrics connected in series. One dielectric is the film of air in the gap and the other is the dielectric member 16. In the preferred embodiment the dielectric member is fabricated from Mylar. Since the breakdown voltage of Mylar is substantially more than the breakdown voltage for atmospheric air, the air ionizes long before the maximum electric field corresponding to the Mylar can be developed across the capacitor plates.

To avoid this problem, a fluid 20 having a high breakdown voltage is used to surround the mercury drop and to eliminate the narrow gaps between the capacitor plates. The fluid also must have very low electrical conductivity in order to prevent any of the charge on the mercury 18 from leaking through the fluid 20 and reaching the surface of the dielectric member 16. This leakage charge, like the ionized air particles, tends to cancel the charge transfer between the capacitors.

Mylar has a breakdown voltage of about 5,000 volts/mil. It is believed that a fluid having a breakdown voltage of at least 1,000 v/mil and a resistivity of at least $10^{12}$ ohm-cm would be satisfactory in a biased system. One fluid having these characteristics is the oil used in commercial high power electrical transformers. For example, the Diola Ax oil obtained from the Shell Oil Company has been used in one embodiment actually constructed. Gases such as Freon and helium can also be used to increase the breakdown voltage. In addition, since the breakdown voltage of a gas is typically directly proportional to its pressure, filling the fluid container 12 with a low conductivity gas at high pressure would also prevent ionization.

In the preferred embodiment, the fluid 20 in the container 12 is also selected to enhance the triboelectric generation of charge. The triboelectric effect described above induces the deposition of negative charges on the upper surface of the dielectric member 16. In FIG. 4 these charges are indicated by reference numeral 24. When one negative triboelectric induced charge is positioned on the upper surface of the dielectric member 16, a corresponding positive charge 25 is bound opposite to it on the surface of the stationary conductor 14. Since the conductor is electrically neutral across its surface, there is an additional negative charge 26 which is bound opposite to the positive charge left on the mercury, when charge 24 was deposited. The net result of triboelectric charge generation is the addition of negative charges to the capacitors C1 and C2.

With each increment of motion of the mercury 18 from left to right, as illustrated in FIG. 4, an equal amount of charge is deposited on the surface of the dielectric member 16. This deposition of charge causes an increase in the overall charge on capacitor C1 as described above. Concurrently with this increase in charge, the capacitance of the capacitor is decreasing because of the motion of the mercury conductor. The voltage V1 across a capacitor C1 is a function of the following expression:

$$V1 = \frac{K(C_{max} - C_1)}{C_1}$$

Where $K$ is a constant representing the amount of charge triboelectrically generated for each increment of capacitance reduction $C_1$ is the instantaneous capacitance of the capacitor, and $C_{max}$ is the maximum value of $C_1$ when the motion of the mercury starts.

It has been observed that a fluid having low electrical conductivity and low viscosity can substantially increase the triboelectric generation of charge. A fluid of low conductivity is preferred in order to prevent the leakage of charge from the mercury drop 18 to the surface of the dielectric member 16 as described above. A fluid having low viscosity is preferred because the frictional contact between the mercury drop and the dielectric member is increased. It is believed that the rubbing contact between the movable conductor and the dielectric member causes the triboelectric effect to occur. A low viscosity fluid is also preferred in order to prevent the fluid from lubricating the mercury. It is also believed that a fluid having a resistivity of at least $10^{15}$ ohm-cm and a viscosity of less than 600 centistokes will satisfy these requirements.

One fluid having low viscosity, a high breakdown voltage and low electrical conductivity is Dimethyl-polysiloxane. This fluid is obtainable from the Dow Corning Corporation of Midland, Michigan 48640. This fluid has a resistivity of $10^{15}$ ohms-cms, a dielectric strength of 35kv/100 mil, and a viscosity of 0.65 centistokes. When used in one embodiment of the present invention that was actually constructed, this fluid generated a bias of approximately 1,000 volts across a 6 um layer of Mylar. This voltage was sufficient to bias the variable capacitors C1 and C2 and to eliminate the need for a separate bias supply.

The present invention contemplates an electrostatic generator for producing electrical power. One application of this generation of power is for charging storage batteries. Referring to FIG. 1, the circuit is connected to a rechargeable battery indicated by reference letters $V_B$. The rechargeable battery has an operating voltage, depending on its construction, of approximately 1.3 to 1.7 volts. Although any suitable rechargeable battery can be used, a nickel cadmium battery is preferred for electronic watch circuits. In FIG. 1 the rechargeable battery is connected in series with a load 28 representing the operating mechanism of the watch.

Connected across the battery $V_B$ in parallel with the load 28 are two diodes, D1 and D2. The cathode of diode D1 is connected to the positive side of the battery, and the cathode of diode D2 is connected to the anode of diode D1. The anode of diode D2 is connected across the battery and in parallel with both the load 28 and the diodes, D1 and D2, are two other diodes, D3 and D4. The cathode of diode D3 is connected to the positive side of the battery, and the cathode of diode D4 is connected to the negative side of the battery. The diodes are selected to have low leakage in order to increase the efficiency of the circuit. The four diodes D1–D4 form a rectifier circuit that converts the AC output from the two variable capacitors C1, C2 into a DC output for charging the battery $V_B$.

In the preferred embodiment, a liquid mercury moving conductor 18 is preferred for several reasons. Because of its high density, the mercury maximizes the conversion of available work into electrical energy. When made of mercury, the moving conductor 18 performs more work in a limited space with minimum motion. Mercury is also preferred because it has high surface tension. During operation the moving conductor is subjected to large acceleration forces and a large electrostatic field. The high surface tension of mercury prevents the liquid drop from breaking up into a plurality of small droplets. These small droplets would retain a charge of their own, and the capacitor, in effect, would lose its power generating capability.

To maximize the generation of power an electrostatic generator must maximize the stored electrical energy per unit of surface area of each capacitor. The stored electrical energy in a capacitor is proportional to $CV^2$, where C is the capacitance of the capacitor and V is the voltage induced across the plates. The capacitance C is proportional to the dielectric constant of the dielectric material and is inversely proportional to its thickness. The voltage V is proportional to the breakdown voltage of the dielectric material. It has been observed that the breakdown voltage for most dielectric materials is proportional to the square root of the thickness of the dielectric. Thus, the electrical energy stored in a capacitor tends to be constant regardless of the thickness of the dielectric material. In the present invention the preferred dielectric material is one which has the highest product of dielectric constant and the square of the breakdown voltage for a given thickness.

A practical means to maximize the generation of power and the amount of energy stored in the capacitors without operating at bias voltages that are too high is to use very thin dielectric materials. For example, the dielectric member 16 can be fabricated from Mylar. In its thinnest presently available commercial form, Mylar has a breakdown voltage of approximately 1,000 volts. An additional, perhaps more suitable dielectric material, is Parylene, obtainable from the Union Carbide Company. A one micron thick layer of Parylene has the breakdown voltage of approximately 500 volts. Thus, Parylene permits the storage of very high energy without requiring a high bias voltage.

The electrostatic generator is operated by subjecting the container 12 and the moving conductor 18 to either random or cyclical forces. These forces can be acceleration forces that either operate directly on the mercury to cause it to slide back and forth or gravitational forces that generate potential energy that is expended in moving the mercury. In the embodiment designed for electronic watches, these forces are provided by the random motion of the watch wearer's wrist. At all times the mercury is free to slide within the container and is only constrained by the dimensions of the container.

In order to describe the operation of the circuit illustrated in FIG. 1, assume as initial conditions that there is a bias voltage of $-500$ volts on point A. This bias voltage is obtained from either the triboelectric effect or from a separate bias supply as described below. The voltage across the battery $V_B$ is approximately 1.7 volts. The capacitance of capacitor C1 is at its maximum value and the capacitance of capacitor C2 is nearly zero. The electrical charge Q on the capacitor C1 is given according to the following equation $Q_1 = C_1 V$, and the energy stored therein is given by the following equation $E_1 = C_1 V^2$.

The energy stored in the capacitors C1 and C2 is transferred by the motion of the mercury 18 in a manner to inversely alternate the capacitance of capacitors C1 and C2. When the capacitance of capacitor C1 is decreased and the capacitance of C2 is increased, the voltage at point F (FIG. 1) becomes positive relative to the voltage at point A. In addition, the voltage at point E becomes negative with respect to the voltage at point A. This change in voltage occurs because both capacitors attempt to maintain the quantity of charge on their plates unchanged. Since the capacitance of C1 has decreased, the voltage across C1 must increase in order to maintain the quantity of charge of Q1 at a constant value. When the voltage across C1 has increased sufficiently, the diode D1 becomes forward biased and current flows through D1. The current path is through diode D1, into the positive side of the battery $V_B$, and through diode D4 to point E. The common terminal point A has no net current flowing through it after it is initially charged. Simultaneously, the capacitance of capacitor C2 is increasing in value and tends to forward bias diode D4. Capacitor C2 tends to drive point F more positive and point E more negative. In summary, as the capacitance of capacitor C1 decreases from its maximum value to zero, the electric charge Q on capacitor C1 is actually transferred from point F through the battery $V_B$ to point E and, thus, the battery is charged by this current.

The energy stored in the capacitors C1 and C2 is transferred back in a cycle that is the reverse of the hereinbefore described sequence. As initial conditions assume that there is a bias voltage at point A of $-500$ volts and the voltage across the battery is approximately 1.7 volts. The capacitance of capacitor C1 is at a minimum value and the capacitance of capacitor C2 is at a maximum value. Capacitor C2 contains an electronic charge given by the equation $Q2 = C_2 V$.

When the mechanical motion, hereinafter described, causes the capacitance of capacitor C2 to decrease, the voltage at point E becomes positive relative to the voltage at point A. Simultaneously, the capacitance of capacitor C1 tends to increase and the voltage at point F tends to go negative. As before both capacitors initially try to maintain the quantity of charge on their plates unchanged. When the voltage across C2 increases sufficiently, diode D3 becomes forward biased. The electric charge flows from point E through diode D3, into the positive side of the battery, and through the diode D2 to point F. The common terminal point A has no net current flowing through it.

It should be noted that in each part of the cycle there is a net current flow through the battery and this flow is always from the positive side to the negative side of the battery. Thus, battery charging current is produced regardless of which direction the values of capacitance are changing.

It should be further noted that the sum of the electric charges on points E and F remains unchanged throughout the cycle of capacitance change. Although there is a net production of energy which charges the battery, there is no loss of electric charge. The energy for charging the battery is generated by a moving conductor 18 that moves against the electrostatic forces caused by the voltage difference between points E and F.

Although the preferred embodiment incorporates a battery $V_B$, it should be appreciated that any suitable electrical energy storage device can be substituted for the battery $V_B$. Suitable energy storage devices are those that can store between cycles the electrical energy generated by mechanical motion and then can be discharged into the load. The construction and operation of the remainder of the circuit remains exactly the same. These storage devices include, for example, a large capacitor that is charged up by the current flow and then discharged into the load. The large capacitor replaces the battery $V_B$ and is connected at the same point in the circuit, FIG. 1. In like manner, the battery $V_B$ can also be replaced by a DC motor connected to a fly wheel. The electrical energy generated by the circuit drives the DC motor and attached fly wheel thereby storing the generated electrical energy as kinetic energy. The stored energy can be recovered by a DC or AC generator also connected and driven by the fly wheel.

Another suitable electrical energy storage device that can be substituted for the battery $V_B$, FIG. 1 is a power distribution system. These distribution systems include the domestic power systems operated by public utilities and the private systems operated on ships and in independent commercial installations. When operating, a power distribution system is a short term, energy storage device because of the transmission time through the system between the energy generator and the load. In effect, the energy generator charges up the transmission lines and after a short period of time, the lines discharge into the load. In some cases there can be hundreds of miles of transmission lines between the generator and the load and the transmission time can be quite substantial. In addition, a power distribution system acts as a buffer between the energy generator and the load. In most applications the load varies continuously and correspondingly changes the power demanded from the generator. The distribution system smooths out the fluctuations in power demand. This operation of the distribution system as a buffer between the energy generator and the load is comparable to the operation of the battery $V_B$ described hereinbefore.

To provide sufficient charging current for a power distribution system, a plurality of simultaneously operating energy generators are used and their outputs are connected to a conventional DC to AC converter. For example, a large number of energy generators can be floated on the surface of the ocean and accelerated by the motion of the ocean waves. The generators are disbursed over a wide area so that at any instant in time each energy generator is undergoing a different acceleration force. The energy generators are all connected in common to a DC/AC converter so that a nearly continuous AC output is obtained. This AC output is connected to the power distribution system and the electrical energy is thereby stored and transmitted to the load.

Although the preferred embodiment incorporates a battery $V_B$, it also should be appreciated that the circuit of FIG. 1 can be operated without a battery or an energy storage device. The two variable capacitors C1 and C2 and the four diodes D1–D4 form an electrostatic power generator and can be connected directly to a load as illustrated in FIG. 1.

Although the triboelectric effect described above can develop sufficient voltage to bias the circuit of FIG. 1, less severe requirements on the fluid surrounding the moving conductor can be applied by pre-charging the two variable capacitors C1 and C2 to a high voltage. To pre-charge the variable capacitors, the pulse transformer circuit illustrated in FIG. 1 is used to apply a high voltage across both variable capacitors. When point G is given a positive pulse, the transistor Q1 and the transformer generate a high voltage which is rectified through diode D5. A conventional blocking oscillator can also be used to charge the variable capacitors.

It has also been observed that when some fluids are used in the container, there is a certain amount of charge leakage between the moving conductor 18 and the dielectric member 16. One example of such a fluid is transformer oil that has been contaminated by water. This leakage causes electrical charges to accumulate on the surface of the dielectric member 16 and to neutralize the electrostatic field between the plates of the two capacitors. This leakage is a problem because it decreases the efficiency of power generation.

Referring to FIG. 1, the circuit including transistor Q2 is used to discharge the two capacitors C1, C2 and to remove the build up of charge on the capacitor plates due to charge leakage through the fluid 20. When transistor Q2 is pulsed at point H, capacitors C1 and C2 are discharged through diodes D1 and D3.

To increase the energy exchange between capacitors C1 and C2 in FIG. 1 and thereby the charging energy to the load, an impedance matching arrangement is used. This may take the form of a DC/DC converter 30, FIG. 5 for converting the high voltage differentials between points K and L, FIG. 1, to a low voltage, high current output applied to the battery and the load.

It should also be noted that if the load or the electrical energy storage device can be charged using AC power, then the diodes D1–D4 are not required. Thus, the circuit of FIG. 6 is used for an AC load. This circuit merely comprises the two variable capacitors C1 and C2 connected in series, and the AC load is placed across points E, F of FIG. 6. The construction and operation of the two capacitors is the same as described above.

In addition, although mercury is disclosed in the preferred embodiment, any conductive liquid or solid can be used for the moving conductor 18.

It is also contemplated that the present invention is operable in all battery power equipment subjected to mechanical motion. This type of equipment includes electronic wrist watches, portable radios, hearing aids, cardiac pacemakers, small portable calculators, navigational buoys, other water borne equipment, and vehicular mounted electronic equipment.

Thus, although the best mode contemplated for carrying out the present invention has been herein shown and described, it will be apparent that modification and variation may be made without departing from what is regarded to be the subject matter of the invention.

What is claimed is:

1. Apparatus for electrostatically generating power by converting mechanical motion into electrical energy, comprising:
   (a) a container for fluid;
   (b) two variable capacitors formed in the container, said capacitors each having a separate conductor and sharing a common dielectric member and a common movable conductor, said common conductor is separated from the separate conductors by the dielectric member, moves between the separate conductors in response to mechanical motion, and thereby inversely alternates the capacitance between the two variable capacitors;
   (c) an output power increasing, electrically resistive fluid held within the container and in contact with the common conductor and the common dielectric member; said fluid having a breakdown voltage substantially greater than atmospheric air;
   (d) circuit means connected to the common conductor and the separate conductors for transferring charge between the variable capacitors and having two output junctions for transmitting electrostatically generated power.

2. An apparatus as in claim 1 in which the fluid has a breakdown voltage of at least 1,000 volts per mil.

3. Apparatus for electrostatically generating power by converting mechanical motion into electrical energy, comprising:
   (a) a container for fluid;
   (b) two variable capacitors formed in the container, said capacitors each having a separate conductor and sharing a common dielectric member and a common movable conductor, said common conductor is separated from the separate conductors by the dielectric member, moves between the separate conductors in response to mechanical motion, and thereby inversely alternates the capacitance between the two variable capacitors;
   (c) a capacitor breakdown voltage increasing fluid held within the container and in contact with the common conductor and the common dielectric member, said fluid having a breakdown voltage substantially greater than atmospheric air and resistivity of greater than $10^{12}$ ohm-centimeters; and
   (d) circuit means connected to the common conductor and the separate conductors for transferring charge between the variable capacitors and having two output junctions for transmitting electrostatically generated power.

4. An apparatus as in claim 3 in which the breakdown voltage increasing fluid has a breakdown voltage of at least 1,000 V/mil.

5. An apparatus as in claim 3 in which the breakdown voltage increasing fluid is transformer oil.

6. An apparatus as in claim 3 in which the breakdown voltage increasing fluid is Dimethypolysiloxane.

7. An apparatus as in claim 3 in which the breakdown voltage increasing fluid is Freon.

8. An apparatus as in claim 3 in which the breakdown voltage increasing fluid is helium.

9. An apparatus as in claim 3 in which the common conductor is an electrically conductive liquid connected to the circuit means.

10. An apparatus as in claim 3 in which the common conductor is a drop of mercury.

11. An apparatus as in claim 3 in which means for pre-charging the variable capacitors is connected to the circuit means.

12. An apparatus as in claim 3 in which means for discharging the variable capacitors is connected to the circuit means.

13. Apparatus for electrostatically generating power by converting mechanical motion into electrical energy, comprising:
   (a) a container for fluid;
   (b) two variable capacitors formed in the container, said capacitors each having a separate conductor and sharing a common dielectric member and a common movable conductor, said common conductor is separated from the separate conductors by the dielectric member, moves between the separate conductors in response to mechanical motion, and thereby inversely alternates the capacitance between the two variable capacitors;
   (c) a triboelectric charge generating fluid held within the container and in contact with the common conductor and the common dielectric member, said fluid in combination with the movable conductor generates sufficient charge to bias the variable capacitors, said fluid also has a resistivity substantially greater than atmospheric air; and p1 (d) circuit means connected to the common conductor and the separate conductors for transferring charge between the variable capacitors and having two output junctions for transmitting electrostatically generated power.

14. An apparatus as in claim 13 in which the charge generating fluid has a resistivity of at least $10^{15}$ ohm-cms and a viscosity of less than 600 centistokes.

15. An apparatus as in claim 13 in which the charge generating fluid is Dimethylpolysiloxane.

16. An apparatus as in claim 13 in which the common movable conductor is an electrically conductive liquid connected to the circuit means.

17. An apparatus as in claim 13 in which the common conductor is a drop of mercury.

18. An apparatus as in claim 13 in which means for pre-charging the variable capacitors is connected to the circuit means.

19. An apparatus as in claim 13 in which means for discharging the variable capacitors is connected to the circuit means.

20. Apparatus for charging an electrical energy storage means by converting mechanical motion into electrical energy, comprising:
    (a) an electrical energy storage means chargeable by passing a charging current therethrough;
    (b) first and second diode means connected across said energy storage means;
    (c) third and fourth diode means connected across an energy source, said first and second diode means being connected in parallel with said third and fourth diode means and all of said beforementioned diode means being forward biased with respect to the charging current;
    (d) two variable capacitors each having a separate conductor and sharing a common dielectric member and a common movable conductor, one separate conductor being connected between the first and second diode means and the other separate conductor being connected between the third and fourth diode means, said common conductor is separated from the separate conductors by the dielectric member, moves between the separate conductors in response to mechanical motion, and thereby inversely alternates the capacitance between the two variable capacitors; and
    (e) an output power increasing, electrically resistive fluid held within the two variable capacitors and in contact with the common conductor and the common dielectric member, said fluid having a resistivity substantially greater than atmospheric air.

21. An apparatus as in claim 20 in which the fluid is a capacitor breakdown voltage increasing fluid.

22. An apparatus as in claim 20 in which the fluid is a triboelectric charge generating fluid.

23. An apparatus as in claim 20 in which the electrical energy storage means is a rechargeable DC energy source.

24. An apparatus as in claim 20 in which the electrical energy storage means is a battery.

25. An apparatus as in claim 20 in which the electrical energy storage means is a capacitor that can be charged-up by the variable capacitors and can be discharged into a load.

26. An apparatus as in claim 20 in which the electrical energy storage means is a fly-wheel rotated by a DC motor.

27. An apparatus as in claim 20 in which the electrical energy storage means is a power distribution system.

28. Method for electrostatically generating power by converting mechanical motion into electrical energy, comprising the steps of:
    (a) triboelectrically charging first and second variable capacitors with a quantity of electrical charge;
    (b) generating an electrostatic force field in the first capacitor;
    (c) moving a body against the electrostatic force field in the first capacitor so that charge is transferred through a circuit from the first capacitor to the second capacitor;
    (d) generating an electrostatic force field in the second capacitor; and
    (e) moving the body against the electrostatic force field in the second capacitor so that charge is transferred from the second capacitor back to the first capacitor through the circuit, whereby said transfer of charge between the variable capacitors is the electrostatically generated power.

29. A method as in claim 28 in which the first and second variable capacitors are triboelectrically charged by relative motion between a dielectric material, the moving body, and a fluid in contact with both.

* * * * *